US012131677B2

(12) United States Patent
Liu

(10) Patent No.: US 12,131,677 B2
(45) Date of Patent: Oct. 29, 2024

(54) DRIVING CIRCUIT AND DISPLAY DEVICE

(71) Applicant: TCL China Star Optoelectronics Technology Co., Ltd., Shenzhen (CN)

(72) Inventor: Fangyun Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/610,516

(22) PCT Filed: Sep. 29, 2021

(86) PCT No.: PCT/CN2021/121532
§ 371 (c)(1),
(2) Date: Nov. 11, 2021

(87) PCT Pub. No.: WO2023/039950
PCT Pub. Date: Mar. 23, 2023

(65) Prior Publication Data

US 2024/0249656 A1 Jul. 25, 2024

(30) Foreign Application Priority Data

Sep. 16, 2021 (CN) .......................... 202111086311.0

(51) Int. Cl.
*G09G 3/20* (2006.01)

(52) U.S. Cl.
CPC ....... *G09G 3/20* (2013.01); *G09G 2300/0814* (2013.01); *G09G 2300/0857* (2013.01); *G09G 2320/043* (2013.01); *G09G 2330/021* (2013.01)

(58) Field of Classification Search
CPC ............. G09G 3/20; G09G 2300/0814; G09G 2300/0857; G09G 2320/043; G09G 2330/021
See application file for complete search history.

(56) References Cited

U.S. PATENT DOCUMENTS

2009/0256596 A1 10/2009 Oh
2010/0182810 A1* 7/2010 Ashikaga .......... H02M 7/53832 363/37

FOREIGN PATENT DOCUMENTS

CN 204496890 U 7/2015
CN 111048028 A 4/2020
CN 111130535 A 5/2020
CN 111836427 A 10/2020
(Continued)

OTHER PUBLICATIONS

International Search Report in International application No. PCT/CN2021/121532,mailed on May 19, 2022.
(Continued)

*Primary Examiner* — Stephen G Sherman
(74) *Attorney, Agent, or Firm* — Nathan & Associates; Menachem Nathan

(57) ABSTRACT

A driving circuit and a display device are disclosed by the present application. The driving circuit includes a switch control module, a timer, a frequency divider, and a first flip-flop. The driving circuit and the display device provided in the present application may automatically stop the timer and the frequency divider after a blank screen time of the startup ends by adding a switch control module, thereby being capable of saving the power consumption of the driving circuit and improving service life of the display device.

11 Claims, 3 Drawing Sheets

(56) References Cited

FOREIGN PATENT DOCUMENTS

| | | | |
|---|---|---|---|
| CN | 112992099 | A | 6/2021 |
| JP | 2010193373 | A | 9/2010 |

OTHER PUBLICATIONS

Written Opinion of the International Search Authority in International application No. PCT/CN2021/121532,mailed on May 19, 2022.

Chinese Office Action issued in corresponding Chinese Patent Application No. 202111086311.0 dated Mar. 29, 2023, pp. 1-7.

Chinese Office Action issued in corresponding Chinese Patent Application No. 202111086311.0 dated Jun. 3, 2023, pp. 1-6.

* cited by examiner

DRIVING CIRCUIT AND DISPLAY DEVICE

FIELD OF INVENTION

The present application relates to display technology fields, in particular to a driving circuit and a display device.

BACKGROUND OF INVENTION

At present, with market demand, display devices all adopt a Gate Driver on Array (GOA) architecture. The GOA architecture needs to add a driving integrated circuit outside, i.e., a level shifter level shifter, which is generally integrated in a power management integrated chip.

Referring to FIG. 1, FIG. 1 is a schematic structural diagram of a conventional driving circuit. As shown in FIG. 1, in order to ensure a startup timing and not cause abnormality of the display screen, a blank screen time is usually added at startup time, which will ensure that thin film transistors of the display device are in a turned-off state, thus, a pre-circuit as shown in FIG. 1 is added into a power management integrated chip. The pre-circuit 10 includes a timer 102, a frequency divider 103, and a D flip-flop 104 which are sequentially connected. An output terminal of a startup power supply circuit 101 is connected to an input terminal of the timer 102, an output terminal of the timer 102 is connected to an input terminal of the frequency divider 103, an output terminal of the frequency divider 103 is connected to a D input terminal of the D flip-flop 104, and a Q output terminal of the D flip-flop 104 is connected to an input terminal of a display circuit 105. The CP input terminal of the D flip-flop 104 receives a clock signal CK. When all voltages of the startup power supply circuit 101 are outputted, and the signal outputted at the output terminal of the startup power supply circuit 101 changes from low to high, the timer 102 and the frequency divider 103 start to operate to count (or time) the time. The timer operates until the blank screen time ends, then the Q output terminal of the D flip-flop 104 outputs a high level, and the display circuit 105 operates normally.

However, when the level shifter is operating normally, the timer 102 and the frequency divider 103 are still operating, which increases power consumption.

SUMMARY OF INVENTION

Technical Problem

The present application provides a driving circuit and a display device, which may realize that a timer and a frequency divider automatically stop working after a blank screen time is completed, thereby being capable of saving power consumption of the driving circuit and improving a service life of the display device.

Technical Solution

According to a first aspect, the present application provides a driving circuit comprising: a switch control module, a timer, a frequency divider, and a first flip-flop, wherein, the switch control module has a power supply input terminal, a feedback signal input terminal, and an enable signal output terminal: the power supply input terminal of the switch control module is electrically connected to an output terminal of a startup power supply circuit, the enable signal output terminal of the switch control module is electrically connected to an input terminal of the timer, an output terminal of the timer is electrically connected to an input terminal of the frequency divider, an output terminal of the frequency divider is electrically connected to a first input terminal of the first flip-flop, and an output terminal of the first flip-flop is electrically connected to the feedback signal input terminal of the switch control module and an input terminal of a display circuit, the switch control module is configured to output a first enable signal to the timer and the frequency divider upon receiving a startup power supply signal outputted by the startup power supply circuit, and the first enable signal enables the timer and the frequency divider to start operating, the timer and the frequency divider output a trigger signal to the first flip-flop after timing a blank screen time under the control of the first enable signal, so as to trigger the first flip-flop to output a second enable signal to the display circuit, and the second enable signal enables the display circuit to start operating, and the switch control module is further configured to, upon receiving the second enable signal, output a third enable signal to the timer and the frequency divider to turn off the timer and the frequency divider.

In the driving circuit provided by the present application, the switch control module comprises a second flip-flop, a first inverter, a second inverter, and an AND gate, a first input terminal of the second flip-flop is electrically connected to the power supply input terminal, a second input terminal of the second flip-flop is electrically connected to an output terminal of the first inverter, and an output terminal of the second flip-flop is electrically connected to a first input terminal of the AND gate, an input terminal of the first inverter is electrically connected to the power supply input terminal, an input terminal of the second inverter is electrically connected to the feedback signal input terminal, and an output terminal of the second inverter is electrically connected to a second input terminal of the AND gate, and an output terminal of the AND gate is electrically connected to the enable signal output terminal.

In the driving circuit provided by the present application, a first delay jitter detection module is further connected in series between the feedback signal input terminal and the input terminal of the second inverter, and the first delay jitter detection module is configured to delay an input of a signal input from the feedback signal input terminal to the input terminal of the second inverter.

In the driving circuit provided by the present application, a second delay jitter detection module is further connected in series between the power supply input terminal and the input terminal of the first inverter, and the second delay jitter detection module is configured to delay an input of a signal outputted from the power supply input terminal to the input terminal of the first inverter.

In the driving circuit provided by the present application, when the startup power supply circuit starts to operate, the startup power supply signal is a high level, the first enable signal is a high level, the second enable signal is a high level, and the display circuit starts to operate.

In the driving circuit provided by the present application, when the display circuit starts to operate, the second enable signal is a high level, the third enable signal is a low level, and the timer and the frequency divider are turned off.

In the driving circuit provided by the present application, a second input terminal of the first flip-flop receives a clock signal.

In the driving circuit provided by the present application, after the timer and the frequency divider are turned off, a clear terminal of the first flip-flop switches on the startup power supply signal, so that the output terminal of the first flip-flop continuously outputs a fourth enable signal to maintain an operation of the display circuit.

In the driving circuit provided by the present application, the blank screen time is greater than or equal to 130 milliseconds.

According to a second aspect, the present application further provides a display device comprising a display panel and a driving chip electrically connected to the display panel, the driving chip comprises a driving circuit, the driving circuit comprises a switch control module, a timer, a frequency divider and a first flip-flop; wherein, the switch control module has a power supply input terminal, a feedback signal input terminal, and an enable signal output terminal: the power supply input terminal of the switch control module is electrically connected to an output terminal of a startup power supply circuit, the enable signal output terminal of the switch control module is electrically connected to an input terminal of the timer, an output terminal of the timer is electrically connected to an input terminal of the frequency divider, an output terminal of the frequency divider is electrically connected to a first input terminal of the first flip-flop, and an output terminal of the first flip-flop is electrically connected to the feedback signal input terminal of the switch control module and an input terminal of a display circuit, the switch control module is configured to output a first enable signal to the timer and the frequency divider upon receiving a startup power supply signal outputted by the startup power supply circuit, the first enable signal enables the timer and the frequency divider to start operating, the timer and the frequency divider output a trigger signal to the first flip-flop after timing a blank screen time under a control of the first enable signal, so as to trigger the first flip-flop to output a second enable signal to the display circuit, the second enable signal enables the display circuit to start operating, the switch control module is further configured to, upon receiving the second enable signal, output a third enable signal to the timer and the frequency divider to turn off the timer and the frequency divider, the switch control module includes a second flip-flop, a first inverter, a second inverter, and an AND gate, a first input terminal of the second flip-flop is electrically connected to the power supply input terminal, a second input terminal of the second flip-flop is electrically connected to an output terminal of the first inverter, and an output terminal of the second flip-flop is electrically connected to a first input terminal of the AND gate, an input terminal of the first inverter is electrically connected to the power supply input terminal, an input terminal of the second inverter is electrically connected to the feedback signal input terminal, and an output terminal of the second inverter is electrically connected to a second input terminal of the AND gate, an output terminal of the AND gate is electrically connected to the enable signal output terminal, and the blank screen time is greater than or equal to 130 milliseconds.

In the display device provided by the present application, a first delay jitter detection module is further connected in series between the feedback signal input terminal and the input terminal of the second inverter, and the first delay jitter detection module is configured to delay an input of a signal input from the feedback signal input terminal to the input terminal of the second inverter.

In the display device provided by the present application, a second delay jitter detection module is further connected in series between the power supply input terminal and the input terminal of the first inverter, and the second delay jitter detection module is configured to delay an input of a signal outputted from the power supply input terminal to the input terminal of the first inverter In the display device provided by the present application, when the startup power supply circuit starts to operate, the startup power supply signal is a high level, the first enable signal is a high level, the second enable signal is a high level, and the display circuit starts to operate.

In the display device provided by the present application, when the display circuit starts to operate, the second enable signal is the high level, the third enable signal is a low level, and the timer and the frequency divider are turned off.

In the display device provided by the present application, a second input terminal of the first flip-flop receives a clock signal.

In the display device provided by the present application, after the timer and the frequency divider are turned off, a clear terminal of the first flip-flop switches on the startup power supply signal, so that the output terminal of the first flip-flop continuously outputs a fourth enable signal to maintain an operation of the display circuit.

The driving circuit and the display device provided in the present application may automatically stop the timer and the frequency divider after the blank screen time during startup ends, through adding the switch control module, thereby being capable of saving the power consumption of the driving circuit and improving the service life of the display device.

Advantageous Effects

The driving circuit and the display device provided in the present application may automatically stop the timer and the frequency divider after the blank screen time during startup ends, through adding the switch control module, thereby being capable of saving the power consumption of the driving circuit and improving the service life of the display device.

DESCRIPTION OF DRAWINGS

In order to more clearly illustrate the technical solutions in the embodiments of the present application, the accompanying drawings required for use in the description of the embodiments will be briefly described below. It is apparent that the drawings in the following description are only some embodiments of the present disclosure. For those skilled in the art, without paying any creative work, other drawings may be obtained based on these drawings.

DETAILED DESCRIPTION OF EMBODIMENTS

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application. In the description of the present invention, it should be understood that the specific implementations described herein are intended only to illustrate and explain the present application and are not intended to limit the present application. The terms "first", "second", "third", "fourth", etc., in the description and claims of the present application are used to distinguish different objects, and do not have to be used to describe a specific order.

An embodiment of the present application provides a driving circuit, the driving circuit may realize that a timer and a frequency divider are automatically stopped after a blank screen time of startup ends, so that power consumption of the driving circuit may be saved, and a service life of a display device may be prolonged. Detailed description will be given below. It should be noted that order of description of the following embodiments is not a limitation on the preferred order of the embodiments. The transistors used in all embodiments of the present application may be thin film transistors, field effect transistors, or other devices having same characteristics.

Figure 2:
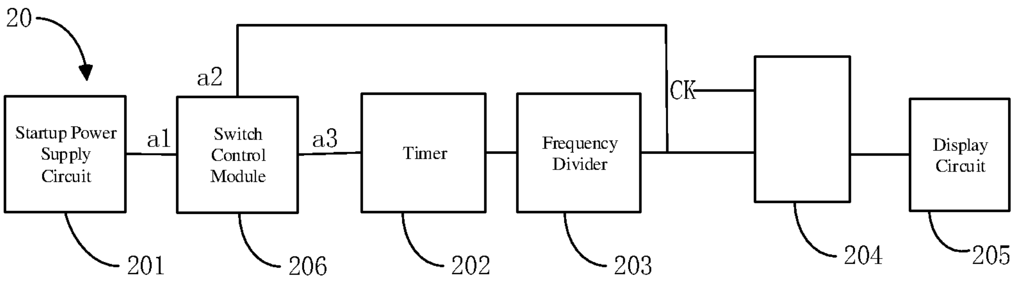
FIG. 2 is a schematic structural diagram of a driving circuit according to an embodiment of the present application.

Referring to FIG. 2, FIG. 2 is a schematic structural diagram of a driving circuit according to an embodiment of the present application. As shown in FIG. 2, the driving circuit 20 provided by the embodiment of the present application includes a startup power supply circuit 201, a switch control module 206, a timer 202, a frequency divider 203, a first flip-flop 204, and a display circuit 205. The switch control module 206 has a power supply input terminal a1, a feedback signal input terminal a2, and an enable signal output terminal a3. The power supply input terminal a1 of the switch control module 206 is electrically connected to an output terminal of the startup power supply circuit 201. The enable signal output terminal a3 of the switch control module 206 is electrically connected to an input terminal of the timer 202. An output terminal of the timer 202 is electrically connected to an input terminal of the frequency divider 203. An output terminal of the frequency divider 203 is electrically connected to a first input terminal of the first flip-flop 204. An output terminal of the first flip-flop 204 is electrically connected to a feedback signal input terminal a2 of the switch control module 206 and an input terminal of the display circuit 205. A second input terminal of the first flip-flop 204 receives a clock signal CK.

The switch control module 206 is configured to output a first enable signal to the timer 202 and the frequency divider 203 when receiving a startup power supply signal from the startup power supply circuit 201, and the first enable signal enables the timer 202 and the frequency divider 203 to start operation. The timer 202 and the frequency divider 203 output a trigger signal to the first flip-flop 204 after timing a blank screen time under the control of the first enable signal, to trigger the first flip-flop 204 to output a second enable signal to the display circuit 205, and the second enable signal enables the display circuit 205 to start operation. Further, the switch control module 206 is further configured to, upon receiving the second enable signal, output a third enable signal to the timer 202 and the frequency divider 203 to turn off the timer 202 and the frequency divider 203.

By adding a switch control module 206, the driving circuit 20 provided in the embodiment of the present application may automatically stop the timer 202 and the frequency divider 203 after the blank screen time of the startup ends, thereby saving the power consumption of the driving circuit 20 and increasing the service life of the display device.

The blank screen time is greater than or equal to 130 milliseconds. That is, in order to ensure the startup timing and not cause problems of an abnormal display screen, a blank screen time is added when the display device is turned on, so as to ensure that the thin film transistors of the display device are in a turned-off state.

When the startup power supply circuit 201 starts operating, the startup power supply signal is a high level, the first enable signal is a high level, the second enable signal is a high level, and the display circuit 205 starts operating.

When the display circuit 205 starts operating, the second enable signal is a high level, the third enable signal is a low level, and the timer 202 and the frequency divider 203 are turned off.

It should be noted that when the startup power supply circuit 201 starts operating, the startup power supply circuit 201 outputs the startup power supply signal to the power supply input terminal a1. After receiving the startup power supply signal, the switch control module 206 outputs a first enable signal at the enable signal output terminal a3, and the first enable signal enables the timer 202 and the frequency divider 203 to start operating. The timer 202 and the frequency divider 203 output a trigger signal to the first input terminal of the first flip-flop 204 after timing a blank screen time, to trigger the first flip-flop 204 to output the second enable signal to the display circuit 205, and the second enable signal enables the display circuit 205 to start operating. Then, when the feedback signal input terminal a2 of the switch control module 206 receives the second enable signal, the enable signal output terminal a3 of the switch control module 206 outputs the third enable signal to the timer 202 and the frequency divider 203 to turn off the timer 202 and the frequency divider 203. After the timer 202 and the frequency divider 203 are turned off, the clear terminal of the first flip-flop 204 switches on the startup power supply signal, so that the output terminal of the first flip-flop 204 continuously outputs a fourth enable signal to maintain the operation of the display circuit 205.

Figure 3:
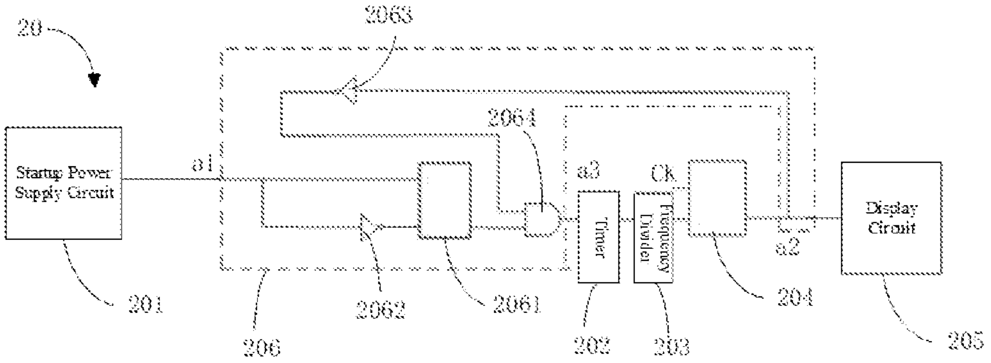
FIG. 3 is a schematic diagram of a first specific circuit of a driving circuit according to an embodiment of the present application.

Specifically, referring to FIG. 3, FIG. 3 is a schematic diagram of a first specific circuit of a driving circuit according to an embodiment of the present application. With reference to FIGS. 2 and 3, in an embodiment of the present application, the switch control module 206 includes a second flip-flop 2061, a first inverter 2062, a second inverter 2063, and an AND gate 2064. It should be noted that the specific circuit of the driving circuit 20 shown in FIG. 3 is only one of the configurations of the driving circuit 20 shown in FIG. 2.

A first input terminal of the second flip-flop 2061 is electrically connected to the power supply input terminal a1. A second input terminal of the second flip-flop 2061 is electrically connected to an output terminal of the first inverter 2062. An output terminal of the second flip-flop 2061 is electrically connected to a first input terminal of the AND gate 2064. An input terminal of the first inverter 2062 is electrically connected to the power supply input terminal a1. An input terminal of the second inverter 2063 is electrically connected to the feedback signal input terminal a2. An output terminal of the second inverter 2063 is electrically connected to a second input terminal of the AND gate 2064. An output terminal of the AND gate 2064 is electrically connected to the enable signal output terminal a3.

It may be understood that the startup power supply circuit 201, the power supply input terminal a1, the first inverter 2062, the second flip-flop 2061, the timer 202, the frequency divider 203, the first flip-flop 204, and the display circuit 205 are electrically connected sequentially to form a first circuit. The feedback signal input terminal a2, the second inverter 2063, the second flip-flop 2061, the timer 202, and the frequency divider 203 are electrically connected sequentially to form a second circuit.

In the first circuit, when the startup power supply circuit 201 starts to operate, the startup power supply circuit 201 outputs the startup power supply signal to the power supply input terminal a1. At this time, startup of all paths have been completed, and the startup power supply signal changes from a low potential to a high potential, that is, from a state "0" to a state "1". The startup power supply signal is outputted to the first input terminal of the second flip-flop 2061, and the first input terminal of the second flip-flop 2061 is at a high potential, that is, in the state "1". The startup power supply signal is outputted to the second input terminal of the second flip-flop 2061 via the first inverter 2062, and the second input terminal of the second flip-flop 2061 is at a low potential. At this time, since the first input terminal of the second flip-flop 2061 is at the high potential and the second input terminal of the second flip-flop 2061 is at the low potential, the output terminal of the second flip-flop 2061 is at a high potential, that is, in the state "1". At this time, the first enable signal outputted from the enable signal output terminal a3 is a high potential, that is, the state "1". The first enable signal is outputted to the timer 202 and the frequency divider 203, and the timer 202 and the frequency divider 203 start operating. The timer 202 and the frequency divider 203 output the trigger signal to the first input terminal of the first flip-flop 204 after timing a blank screen time, to trigger the first flip-flop 204 to output the second enable signal to the display circuit 205, and the second enable signal enables the display circuit 205 to start operating. At this time, the second enable signal is a high potential, that is, in the state "1".

In the second circuit, the second enable signal is outputted as a feedback signal to the feedback signal input terminal a2. The second enable signal is outputted to the second input terminal of the AND gate 2064 through the second inverter 2063, and the second input terminal of the AND gate 2064 is at a low potential, that is, in the state "0". At this time, since the second input terminal of the AND gate 2064 is at the low potential, that is, in the state "0", this causes the output terminal of the AND gate 2064 to also be at a low potential, that is, in the state "0", which causes the enable signal output terminal a3 to be at the low potential, that is, in the state of "0", to output the third enable signal to the timer 202 and the frequency divider 203 to turn off the timer 202 and the frequency divider 203.

Figure 4:
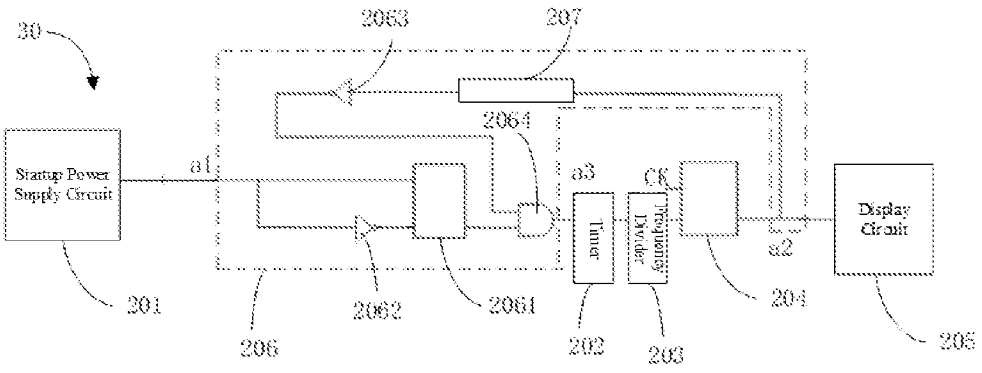
FIG. 4 is a schematic diagram of a second specific circuit of a driving circuit according to an embodiment of the present application.

Referring to FIG. 4, FIG. 4 is a schematic diagram of a second specific circuit of a driving circuit according to an embodiment of the present application. The difference between the driving circuit 30 shown in FIG. 4 and the driving circuit 20 shown in FIG. 3 is that: in the driving circuit 30 shown in FIG. 4, a first delay jitter detection module 207 is connected in series between the feedback signal input terminal a2 and the input terminal of the second inverter 2063. The first delay jitter detection module 207 is configured to delay the input of the signal input from the feedback signal input terminal a2 to the input terminal of the second inverter 2063.

In the driving circuit provided in the embodiment of the present application, by adding the switch control module 206, it is possible to automatically stop the timer 202 and the frequency divider 203 after the blank screen time of the startup ends, thereby being capable of saving the power consumption of the driving circuit 30 and improving the service life of the display device. At the same time, in this embodiment of the present application, by adding the first delay jitter detection module 207, false detection may be prevented.

Figure 5:
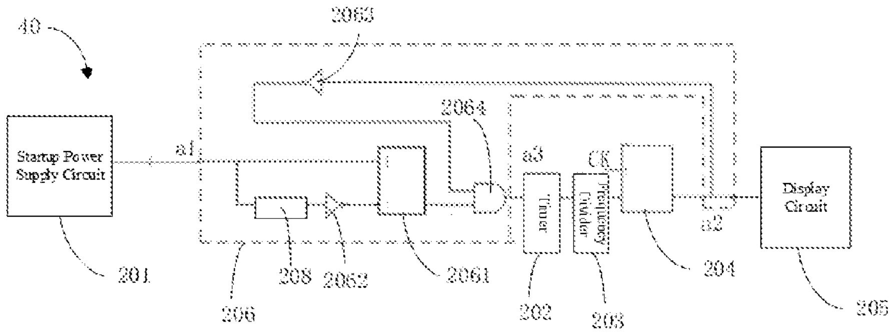
FIG. 5 is a schematic diagram of a third specific circuit of a driving circuit according to an embodiment of the present application.

Referring to FIG. 5, FIG. 5 is a schematic diagram of a third specific circuit of a driving circuit according to an embodiment of the present application. The difference between the driving circuit 40 shown in FIG. 5 and the driving circuit 20 shown in FIG. 3 is that: in the driving circuit 40 shown in FIG. 5, a second delay jitter detection module 208 is connected in series between the power supply input terminal a1 and the input terminal of the first inverter 2062. The second delay jitter detection module 208 is configured to delay the input of the signal outputted from the power supply input terminal a1 to the input terminal of the first inverter 2062.

In the driving circuit provided in the embodiment of the present application, by adding the switch control module 206, it is possible to automatically stop the timer 202 and the frequency divider 203 after the blank screen time of the startup ends, thereby being capable of saving the power consumption of the driving circuit 40 and improving the service life of the display device. At the same time, in this embodiment of the present application, by adding the second delay jitter detection module 208, false detection may be prevented.

Figure 6:
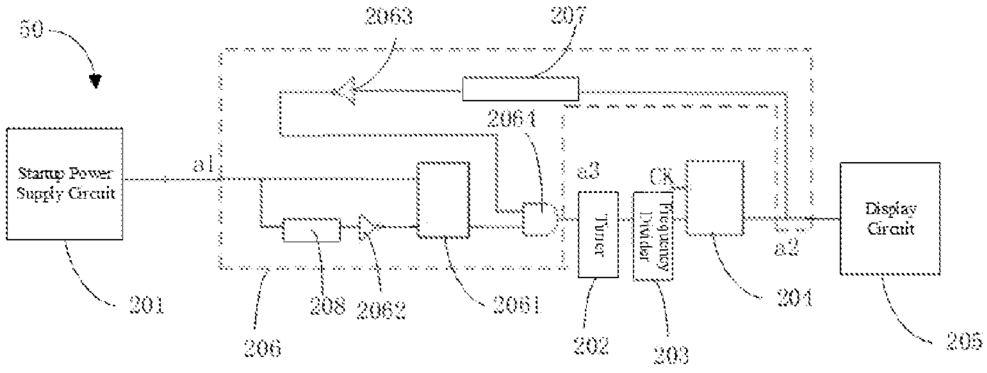
FIG. 6 is a schematic diagram of a fourth specific circuit of a driving circuit according to an embodiment of the present application.

Referring to FIG. 6, FIG. 6 is a schematic diagram of a fourth specific circuit of a driving circuit according to an embodiment of the present application. The difference between the driving circuit 50 shown in FIG. 6 and the driving circuit 20 shown in FIG. 3 is that: in the driving circuit 50 shown in FIG. 6, the first delay jitter detection module 207 is connected in series between the feedback signal input terminal a2 and the input terminal of the second inverter 2063: the second delay jitter detection module 208 is also connected in series between the power supply input terminal a1 and the input terminal of the first inverter 2062. The first delay jitter detection module is configured to delay the input of the signal input from the feedback signal input terminal a2 to the input terminal of the second inverter 2063. The second delay jitter detection module 208 is configured to delay the input of the signal outputted from the power supply input terminal a1 to the input terminal of the first inverter 2062.

In the driving circuit provided in the embodiment of the present application, by adding the switch control module 206, it is possible to automatically stop the timer 202 and the frequency divider 203 after the blank screen time of the startup ends, thereby being capable of saving the power consumption of the driving circuit 50 and improving the service life of the display device. At the same time, in this embodiment of the present application, by adding the first and second delay jitter detection modules 207 and 208, false detection may be prevented.

Figure 1:
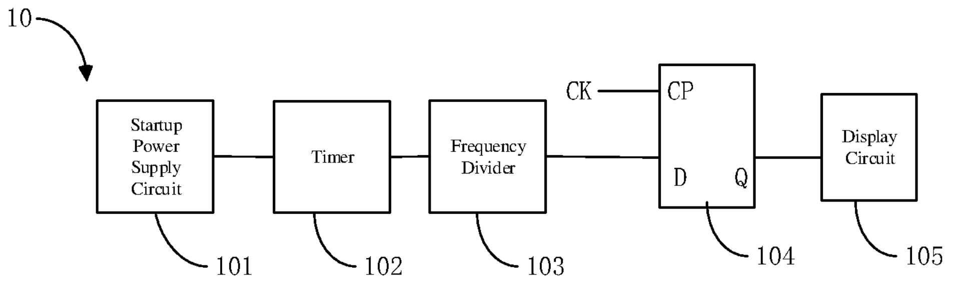
FIG. 1 is a schematic structural diagram of a conventional driving circuit.
Figure 7:
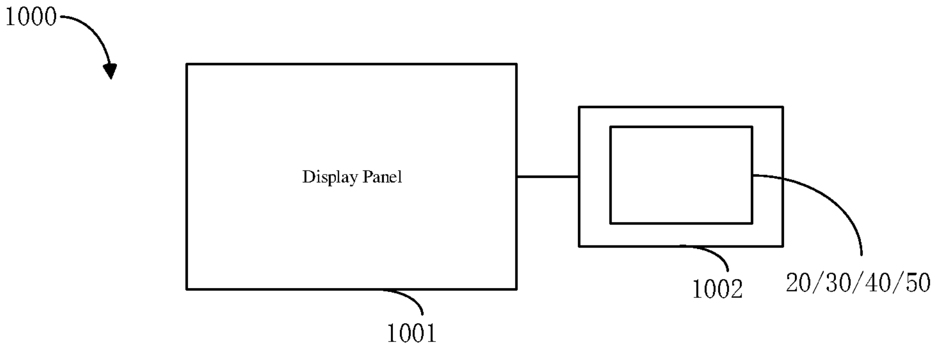
FIG. 7 is a schematic structural diagram of a display device according to an embodiment of the present application.

Referring to FIG. 7, FIG. 7 is a schematic structural diagram of a display device according to an embodiment of the present application. As shown in FIG. 1, the display device 1000 provided in the embodiment of the present application includes a display panel 1001 and a driving chip 1002 electrically connected to the display panel 1001. The driving chip 1002 includes a driving circuit 20/30/40/50. For details of the driving circuit 20/30/40/50, please refer to the above embodiments, which will not be repeated here.

According to the display device provided in the embodiment of the present application, by adding a switch control module, it is possible to automatically stop the timer and the frequency divider after the blank screen time of the startup ends, thereby being capable of saving the power consumption of the driving circuit and improving the service life of the display device.

The driving circuit and display device provided in the embodiments of the present application are described in detail above. The principles and implementations of the present application are described by using specific examples herein. The above description of the embodiments is merely intended to help understand the method and core ideas of the present application. At the same time, a person skilled in the art may make changes in the specific embodiments and application scope according to the idea of the present application. In conclusion, the content of the specification should not be construed as a limitation to the present application.

What is claimed is:

1. A driving circuit comprising: a switch control module, a timer, a frequency divider, and a first flip-flop, wherein the switch control module has a power supply input terminal, a feedback signal input terminal, and an enable signal output terminal; the power supply input terminal of the switch control module is electrically connected to an output terminal of a startup power supply circuit, the enable signal output terminal of the switch control module is electrically connected to an input terminal of the timer, an output terminal of the timer is electrically connected to an input terminal of the frequency divider, an output terminal of the frequency divider is electrically connected to a first input terminal of the first flip-flop, and an output terminal of the first flip-flop is electrically connected to the feedback signal input terminal of the switch control module and an input terminal of a display circuit, the switch control module is configured to output a first enable signal to the timer and the frequency divider upon receiving a startup power supply signal outputted by the startup power supply circuit, and the first enable signal enables the timer and the frequency divider to start operating, the timer and the frequency divider output a trigger signal to the first flip-flop after timing a blank screen time under the control of the first enable signal, so as to trigger the first flip-flop to output a second enable signal to the display circuit, and the second enable signal enables the display circuit to start operating, and the switch control module is further configured to, upon receiving the second enable signal, output a third enable signal to the timer and the frequency divider to turn off the timer and the frequency divider;

wherein the switch control module comprises a second flip-flop, a first inverter, a second inverter, and an AND gate;

wherein a first input terminal of the second flip-flop is electrically connected to the power supply input terminal, a second input terminal of the second flip-flop is electrically connected to an output terminal of the first inverter, and an output terminal of the second flip-flop is electrically connected to a first input terminal of the AND gate;

wherein an input terminal of the first inverter is electrically connected to the power supply input terminal;

wherein an input terminal of the second inverter is electrically connected to the feedback signal input terminal, and an output terminal of the second inverter is electrically connected to a second input terminal of the AND gate; and wherein an output terminal of the AND gate is electrically connected to the enable signal output terminal.

2. The driving circuit of claim 1, wherein when the startup power supply circuit starts to operate, the startup power supply signal is a high level, the first enable signal is a high level, the second enable signal is a high level, and the display circuit starts to operate.

3. The driving circuit of claim 1, wherein when the display circuit starts to operate, the second enable signal is a high level, the third enable signal is a low level, and the timer and the frequency divider are turned off.

4. The driving circuit of claim 1, wherein a second input terminal of the first flip-flop receives a clock signal.

5. The driving circuit of claim 1, wherein after the timer and the frequency divider are turned off, a clear terminal of the first flip-flop switches on the startup power supply signal, so that the output terminal of the first flip-flop continuously outputs a fourth enable signal to maintain operation of the display circuit.

6. The driving circuit of claim 1, wherein the blank screen time is greater than or equal to 130 milliseconds.

7. A display device comprising a display panel and a driving chip electrically connected to the display panel, the driving chip comprises a driving circuit, and the driving circuit comprises a switch control module, a timer, a frequency divider and a first flip-flop, wherein the switch control module has a power supply input terminal, a feedback signal input terminal, and an enable signal output terminal; the power supply input terminal of the switch control module is electrically connected to an output terminal of a startup power supply circuit, the enable signal output terminal of the switch control module is electrically connected to an input terminal of the timer, an output terminal of the timer is electrically connected to an input terminal of the frequency divider, an output terminal of the frequency divider is electrically connected to a first input terminal of the first flip-flop, and an output terminal of the first flip-flop is electrically connected to the feedback signal input terminal of the switch control module and an input terminal of a display circuit, the switch control module is configured to output a first enable signal to the timer and the frequency divider upon receiving a startup power supply signal outputted by the startup power supply circuit, the first enable signal enables the timer and the frequency divider to start operating, the timer and the frequency divider output a trigger signal to the first flip-flop after timing a blank screen time under a control of the first enable signal, so as to trigger the first flip-flop to output a second enable signal to the display circuit, the second enable signal enables the display circuit to start operating, the switch control module is further configured to, upon receiving the second enable signal, output a third enable signal to the timer and the frequency divider to turn off the timer and the frequency divider, the switch control module includes a second flip-flop, a first inverter, a second inverter, and an AND gate, a first input terminal of the second flip-flop is electrically connected to the power supply input terminal, a second input terminal of the second flip-flop is electrically connected to an output terminal of the first inverter, and an output terminal of the second flip-flop is electrically connected to a first input terminal of the AND gate, an input terminal of the first inverter is electrically connected to the power supply input terminal, an input terminal of the second inverter is electrically connected to the feedback signal input terminal, and an output terminal of the second inverter is electrically connected to a second input terminal of the AND gate, an output terminal of the AND gate is electrically connected to the enable signal output terminal, and the blank screen time is greater than or equal to 130 milliseconds.

8. The display device of claim 7, wherein when the startup power supply circuit starts to operate, the startup power supply signal is a high level, the first enable signal is a high level, the second enable signal is a high level, and the display circuit starts to operate.

9. The display device of claim 7, wherein when the display circuit starts to operate, the second enable signal is the high level, the third enable signal is a low level, and the timer and the frequency divider are turned off.

10. The display device of claim 7, wherein a second input terminal of the first flip-flop receives a clock signal.

11. The display device of claim 7, wherein after the timer and the frequency divider are turned off, a clear terminal of the first flip-flop switches on the startup power supply signal, so that the output terminal of the first flip-flop continuously outputs a fourth enable signal to maintain operation of the display circuit.

* * * * *